March 4, 1969 R. ESCHE ET AL 3,431,382
INDUCTION HEATING APPARATUS
Filed May 20, 1966

WITNESSES
Theodore F. Wrobel
James F. Young

INVENTORS
Rolf Esche
and Werner V. Hacht
BY
D. J. Straitiff
AGENT

United States Patent Office 3,431,382
Patented Mar. 4, 1969

3,431,382
INDUCTION HEATING APPARATUS
Rolf Esche and Werner V. Hacht, Erlangen, Germany, assignors to Siemens Aktiengesellschaft, Erlangen, Germany
Filed May 20, 1966, Ser. No. 551,638
Claims priority, application Germany, June 25, 1965, S 97,818
U.S. Cl. 219—10.79      3 Claims
Int. Cl. H05b *9/02, 5/00*

ABSTRACT OF THE DISCLOSURE

Apparatus for uniformly heating workpieces of various thicknesses by an induction heating coil which is adjustable in width for close coupling with the different workpiece thicknesses. An adjustable frequency changer is adjusted automatically responsively to changes in coil width to furnish different energizing current frequencies to the heating coil for maintaining a substantially constant ratio of depth of current penetration to workpiece thickness throughout the range of thicknesses accommodated by the heating coil.

---

The present invention relates to apparatus for induction heating of workpieces of various dimensions involving use of induction coils with adjustable dimensions. The so-far known induction heating apparatuses are, as a rule, single-purpose. They operate with constant frequency and with constant coil dimensions. If pieces of various dimensions, especially of various thicknesses, are to be induction heated, the usual practice has been to change the coil. There have been, however, apparatuses which employ adjustable induction coils in attempt to solve the problem. Thus, for example, there is known a transfer heater apparatus in which one half of the coil is arranged so that it can slide (move) in a direction perpendicular to the longitudinal axis of the coil. Induction coils of this type have the advantage that the same induction coil can be used for workpieces of various dimensions always with the must favorable coupling distance. But, they do not solve the problem of full utilization of the rated output of the heating apparatus so that it can be fully utilized at a given length of the path of the heating, regardless of the workpiece thickness, whereby the same output in terms of weight of the workpieces per unit of time can be uniformly heated to a constant temperature over the entire range of adjustability of the induction coil.

Accordingly, it is a prime object of the present invention to provide apparatus which solves such problem and obtains such result.

The symbols employed herein are defined as follows:

$f$=frequency
$\delta$=depth of penetration or skin depth
$t$=heating time
$C_v$=capacitance
$N$=rated power (output)
$D$=thickness of the workpiece
$L$=inductance
$W$=width of the induction coil
$U$=voltage
$\cos \phi$=power factor As a background for the present invention, experiments have shown that when matching the frequency $f$ to the thickness of the workpiece it occurs that the depth of penetration $\delta$—which is a function of material characteristics in a known relationship with the frequency $f$ of the induction coil current ($f \sim 1/\delta^2$)—corresponds to about one-third of the thickness D of the workpiece, and that the heating time $t$ corresponds to a relationship $t \sim (D-\delta)^2$. Then this means, that under the above mentioned supposition $D \approx 3\delta$, the heating time $t$ increases approximately with the square of the thickness D of the workpiece. Now if the induction coil is energized at a constant frequency $f$, and if the inside dimension of the induction coil is increased so that the relationship $D \approx 3\delta$ does not apply anymore, then for thicker workpieces the heating time increases greater than with the square of the thickness D.

It has been found, that at a workpiece thickness of 50 mm. and at a constant frequency $f$—2 kHz., in case of doubling the thickness of the workpiece to $D=10$ mm., the heating time $t$ increases up to 7 to 8 times. This means therefore, that when an adjustable induction coil is energized at a constant frequency $f$ and at matching this frequency for example to the smallest thickness of a workpiece $D_{min}$ in such manner that the relationship $D \approx 3\delta$ applies, in case of opening the coil to $D_{max}$ either the length of the heating path must be increased so that the rated output $N_n$ of the heating device can be utilized fully, or else the available output of the heating device at the constant (unchanged) length of the heating path in case of the thicker workpieces cannot be fully utilized.

The problem of the present invention is to provide apparatus, which will make it possible, when adjustable induction coils are used, to utilize the full built-in power of the heating apparatus over the entire range of adjustment. Therefore it should be possible to keep the output rate on a unit weight basis about constant (the same) over the entire range of adjustment of the coil at uniform heating of the workpieces.

According to the present invention, that object is obtained by adjusting the frequency of the induction coil current and voltage to satisfy the condition $3\delta \leq D \leq 4\delta$ simultaneously with or in conjunction with an adjustment of the induction coil dimension to suit the corresponding workpiece dimension in a predetermined relationship such that at an increase of the coil dimension the frequency is reduced and at a decrease of the coil dimension the frequency is increased. The increment (or decrement) of frequency $\Delta f$ is arranged to advantage as a function of change of the workpiece thickness $\Delta D$ so that it meets the condition $$1/\Delta D^3 \leq \Delta f \leq 1/\sqrt{\Delta D}$$

A frequency change within the given range makes it possible to maintain an approximately constant ratio of depth of penetration to the workpiece thickness over the entire range of adjustment of the induction coil. In order to keep the capacitor battery, necessary for compensation of the reactive current, at an approximately constant size, it is of advantage if the frequency increment (or decrement) $\Delta f$ meets the condition $\Delta f = 1/\sqrt{\Delta D}$. A further advantage of the method according to this invention can be realized in the fine tuning of the $\cos \phi$ of the heating device by connecting or disconnecting of capacitors, or connecting or disconnecting or continuously changing of inductance simultaneously with the adjustment of the inductor coil and the changing of the frequency. In case of energizing the adjustable induction coil by a static frequency changer, one of the frequency-determining means of the frequency changer is to advantage mechanically coupled with the mechanism for adjusting the induction coil. Finally, it is advantageous that the $\cos \phi$—determining means of the heating apparatus are coupled mechanically with the induction coil adjusting mechanism.

Examples of construction corresponding to the invention are shown in the drawing and they are described in detail hereinafter with reference to these drawings, in which.

Figure 1:
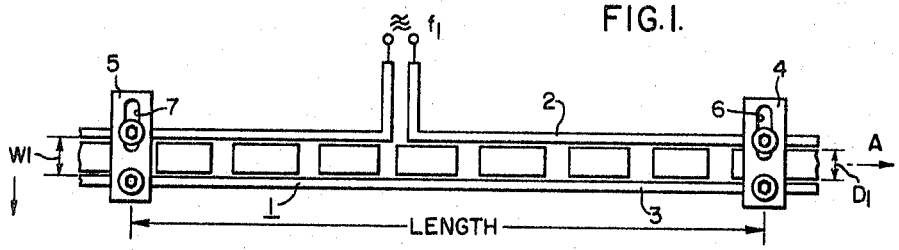
FIGURE 1 shows schematically an induction coil, exemplified in form of a single-turn tunnel coil with one side adjustable, in the position of the smallest coil width $W_{min}=W_1$.
Figure 2:
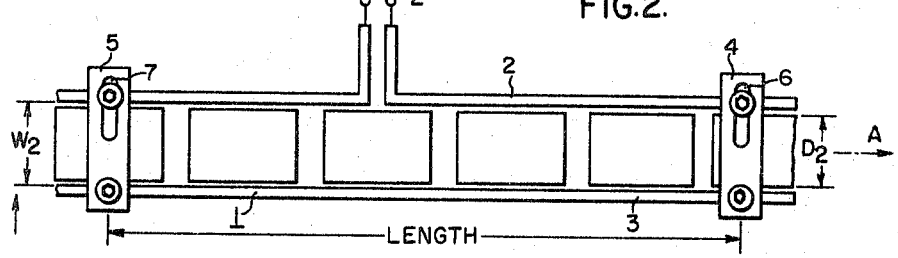
FIG. 2 shows the tunnel coil of FIG. 1 in the position of the largest coil width $W_{max}=W_2$.

In FIGS. 1 and 2, the two sides of an adjustable induction coil 1 are indicated by 2 and 3; these sides are mutually connected by bars (rails) 4 and 5 made of a good electrical conductor material. The coil half 3 is arranged so that it can slide in the direction perpendicular to the coil axis A within an adjustment range corresponding to the elongated hole-like recesses (clearances) 6 and 7. The length of the induction coil is given and it is the same for all shown examples.

By way of example, operating data for the two positions of the induction coil are:

FIG. 1—Thickness of the workpiece $D_1=25$ mm. Width of the induction coil $W_1=W_{min}=30$ mm. Frequency $f_1=8$ kHz.

FIG. 2—Diameter of the workpiece $D_2=50$ mm. Width of the induction coil $W_2=W_{max}=60$ mm. Frequency $f_2=2$ kHz.

Under the assumption that the inductance of the coil changes approximately proportionately with the coil width W, we can express the two inductances as:

FIG. 1: $L_1$

FIG. 2: $L_2 \approx 2L_1$

This stipulates, for reactive current compensation, a change of capacitance from $C_1$ (FIG. 1) to $C_2 \approx 8C_1$ (FIG. 2).

The frequency values specified in the example result from the condition that simultaneously with the change of the position of the induction coil the operating frequency is so adjusted that the depth of penetration $\delta$ always amounts to a third or to a fourth of the diameter D of the workpiece. When we thereby use as a basis the known physical function $f \sim 1/\delta^2$ then a frequency change (increment or decrement) $\Delta f \sim 1/\Delta D^2$ meets exactly the given condition.

In many cases it can be of advantage to operate with the same (constant) or approximately the same capacitor battery if we abandon the optimum heating time for all workpiece thicknesses $D_v$. In this case there is an advantage to use of a smaller frequency variation, approximately of the form $\Delta f \sim 1/\Delta D$ or $\Delta f \sim 1/\sqrt{\Delta D}$. Thereby the first equation makes it possible to keep the capacitor battery constant based on the principle that the inductance of the coil changes with the square of the width W of the coil, as it is approximately in the case of a cylindrical coil, while the second equation is more favorable with respect to the constant capacitor battery in case of the elongated tunnel coil shown herein because for this kind of coil the inductance changes with the width of the coil about linearly. For shorter tunnel coils the dependency lies between the two above relationships. This can lead to a frequency variation $\Delta f \sim \Delta D^{2/3}$.

The variation of frequency in case of energizing the induction coil 1 from a high frequency generator can be obtained continuously by adjusting the members determining the frequency, for example the inductances or the capacitances, or else in case of energizing by static frequency changers by adjusting the RC element or the control frequency. It is conceivable that in many cases a step-by-step frequency regulation is sufficient. A frequency regulation of this type can be obtained for example by interposition of frequency multipliers or by switching around various medium or high frequency networks (circuits). Simultaneously with the change of frequency during adjusting the induction coil there can be made a fine tuning of cos $\phi$.

Figure 3:
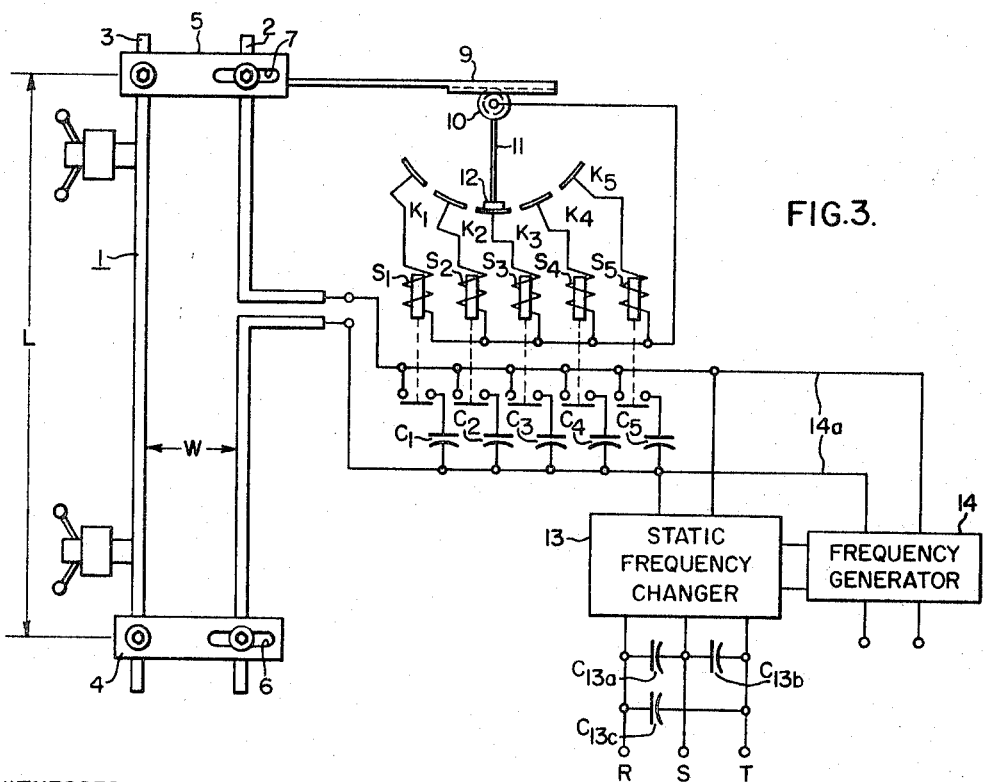
FIG. 3 shows the coil of FIG. 1 or 2 energized from a frequency changer with simultaneous capacitive regulation of cos $\phi$, in accord with features of the present invention.
Figure 4:
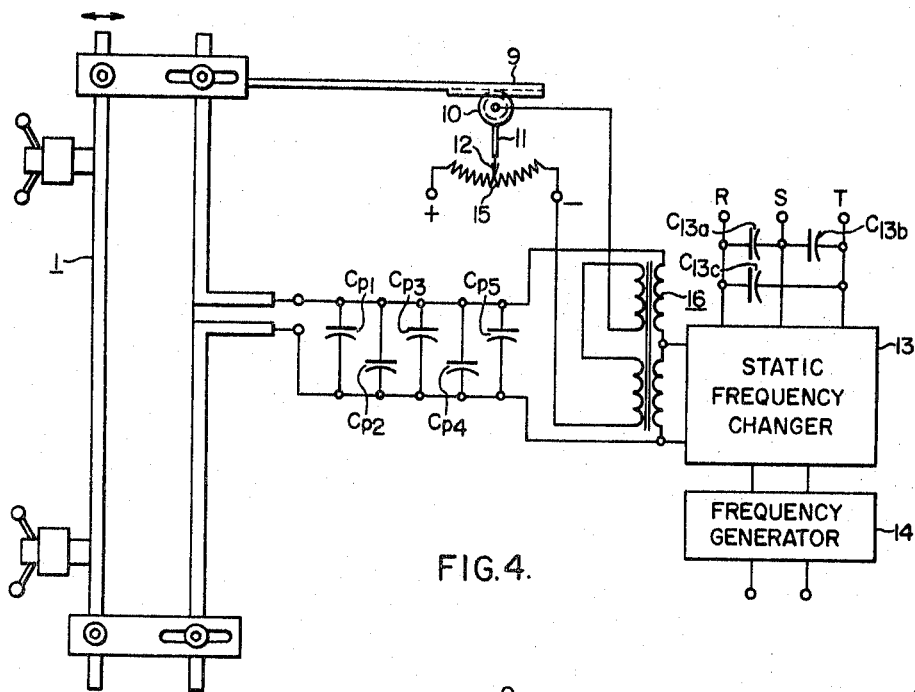
FIG. 4 shows an alternate construction of the apparatus of FIG. 3 wherein simultaneous regulation of cos $\phi$ is obtained inductively.

An example of that is shown in FIGS. 3 and 4.

In FIG. 3, the same parts of the adjustable induction coil 1 are designated by the same numerals as in FIGS. 1 and 2. 8a and 8b show schematically a coil adjustment mechanism providing a continuous matching of the width W of the induction coil to the thickness D of the workpieces. The position of the induction coil in FIG. 3 corresponds approximately to the middle position. To one of the two rails 4 and 5 there is attached a rack 9 which is moved along with the adjustment of the coil side 3. A gear 10 engages with the rack 9 and on a contact arm 11 of the former there is arranged a contact head 12. This contact head 12 slides over contacts $K_1$ to $K_5$ which operate contactors $S_1$ to $S_5$ to connect and disconnect capacitors $C_1$ to $C_5$ respectively in parallel to or from the inductor coil 1. It is understood that the contactors $S_1$ to $S_5$ must be arranged so that the number of the capacitors in parallel with the coil are progressively increased when the coil width W is being increased and decreased when the coil width W is decreased (at the simultaneous change of frequency). 13 indicates a frequency changer which is at the network side compensated by the capacitors $C_{13a}$, $C_{13b}$, $C_{13c}$. For example, the frequency changer can be a static frequency changer, the frequency generator 14 of which can be separately controlled from a timing device, but the frequency changer 13 can be self-commutated, as is indicated by the line connections 14a. The arrangement according to FIG. 3 not only makes it possible to change the frequency $f$ of the induction coil current and voltage as a function of the width W of the induction coil (by corresponding change of the control frequency of the frequency generator 14), but at the same time also to obtain a capacitive tuning of the cos $\phi$ of the heating equipment in steplike manner. It is evident, that instead of the shown five compensation steps, also more or fewer steps can be used.

FIG. 4 shows an arrangement which permits an inductive fine tuning of a cos $\phi$ of the heating equipment simultaneous with the change of frequency. The contact head 12 picks up on an adjusting (sliding) potentiometer 15 a higher or a lower voltage depending on the width of the induction coil; this voltage is applied to a pre-magnetized (biased) reactor 16 with a center tap connection. Rough tuning of the cos $\phi$ is obtained by means of fixed or dajustable parallel capacitors $C_{p1}$ to $C_{p5}$. The frequency changer again can be either separately controlled or self-commutating.

Figure 5:
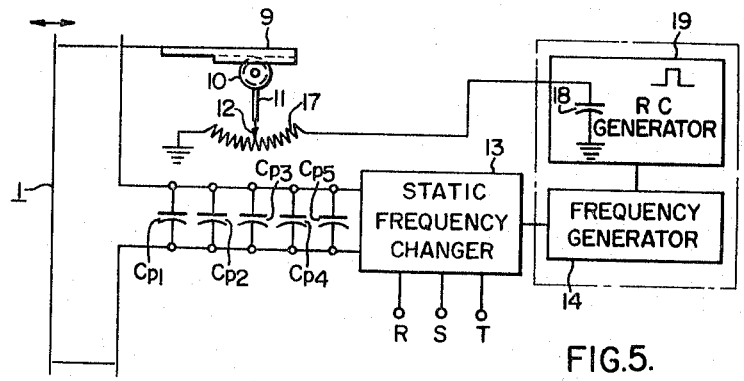
FIG. 5 shows energizing of an induction coil according to FIG. 1 or 2 through a separately controlled frequency changer.

FIG. 5 shows a frequency regulation with a separatively controlled frequency changer. The simultaneous fine tuning of cos $\phi$ is not shown. It would be carried out in accordance with the arrangements in FIG. 3 or 4 by means of a further mechanical coupling system, that could be connected, for example, with the rail 4. In case of this arrangement the contact head 12 is in working connection with the RC element 17, 18 of a pulse generator or RC generator 19, preferably with the R element which is built as an adjustable (sliding) potentiometer. The RC generator 19 and the frequency generator 14 can be built as one unit, as it is known. Each position of the contact head 12 on the potentiometer 17 sets up a certain control frequency on the frequency changer 13 and thus a certain operating frequency on the induction coil 1.

Figure 6:
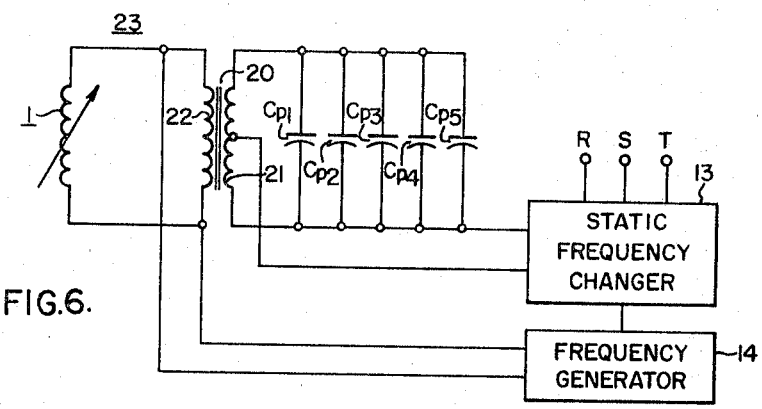
FIG. 6 shows an energizing of an induction coil according to FIG. 1 or 2 with a self-commutating frequency changer.

FIG. 6 shows another form of realization of the idea of the invention. It shows a self-commutating frequency changer with center point tap; its frequency generator 14 is controlled by a resonant circuit 23 which consists of the adjustable induction coil 1 and of the secondary winding of a middle frequency transformer 20 with a primary winding 21. The control frequency of the frequency generator 14 is influenced by the changeable inductivity 1 of the resonance circuit and thus also the operating frequency of the frequency changer 13 is adjusted to the desired value as a function of the width W of the induction coil. Rough tuning of the cos $\phi$ is again obtainable through the parallel capacitors $C_{p1}$ to $C_{p5}$.

The above-mentioned examples of application can be extended further or changed within the spirit of the invention. Thus, it is also possbile and advantageous, for example, during a constant feeding rate of the workpiece simultaneously with the induction coil adjustment, the change of frequency and the cos $\phi$ adjustment, that the induction voltage is regulated so that the inductor power remains constant. For this purpose the induction coil energizing voltage will be adjusted in the most favorable way so that it will satisfy the proportion $U \sim 4\sqrt{f}$. In case of a varying workpiece feed rate, it is possible to regulate the coil voltage so that the density of the energy flow in workpieces remains constant. To this end, the induction coil energizing voltage is to be so adjusted that it will meet the proportion $U \sim \sqrt{D} \times 4\sqrt{f}$. In addition it is also conceivable that simultaneously with or independently from the frequency change the induction voltage can be so changed that the reactive power supplied to the induction coil is constant.

The invention is not limited to the type of induction coil shown in FIGS. 1 to 5. The idea (principle) of the invention can be extended to apply to any adjustable induction coil. Instead of from the shown static frequency changer, the adjustable induction coil can be energized from any other current and voltage generator for medium and high frequency.

We claim as our invention:

1. Apparatus for inductively heating workpieces of different thicknesses, comprising,
    an induction coil adjustable in width to provide close coupling accommodation for such workpieces over their range of thickness,
    a frequency generator for supply of energizing current to the induction coil to obtain induction heating of the workpieces,
    an adjustable frequency changer capable of changing the frequency of the energizing current to the induction coil within at least a range required to obtain a ratio of depth of current penetration in the various workpieces of from one-third to one-half their thickness throughout the variation range, and
    coil width sensitive means for automatic adjustment of the frequency changer to adjust the frequency of energizing current to the induction coil for maintaining the above ratio for the different workpiece thicknesses respective to the different coil widths.

2. The apparatus of claim 1, wherein the frequency change ($\Delta f$) resultant from the automatic adjustment of the frequency changer is a function of a change in workpiece thickness ($\Delta D$) under the condition $$1/\Delta D^3 \leq \Delta f \leq 1/\sqrt{\Delta D}$$

3. The apparatus of claim 1, further comprising adjustable power factor correcting capacitor means in parallel with the induction coil, adjustable automatically by the coil width sensitive means.

References Cited

UNITED STATES PATENTS 2,570,311   10/1951   Bohnet et al. _____ 219—10.79 X

FOREIGN PATENTS 526,175     3/1927    Germany.
1,484,537   5/1967    France.

OTHER REFERENCES

Hacht: German application 1,186,569, printed Feb. 4, 1965.

Esche: German application No. 1,214,812, printed Apr. 21, 1966.

RICHARD M. WOOD, Primary Examiner.

L. H. BENDER, Assistant Examiner.

U.S. Cl. X.R.

219—10.75